Figure 1:
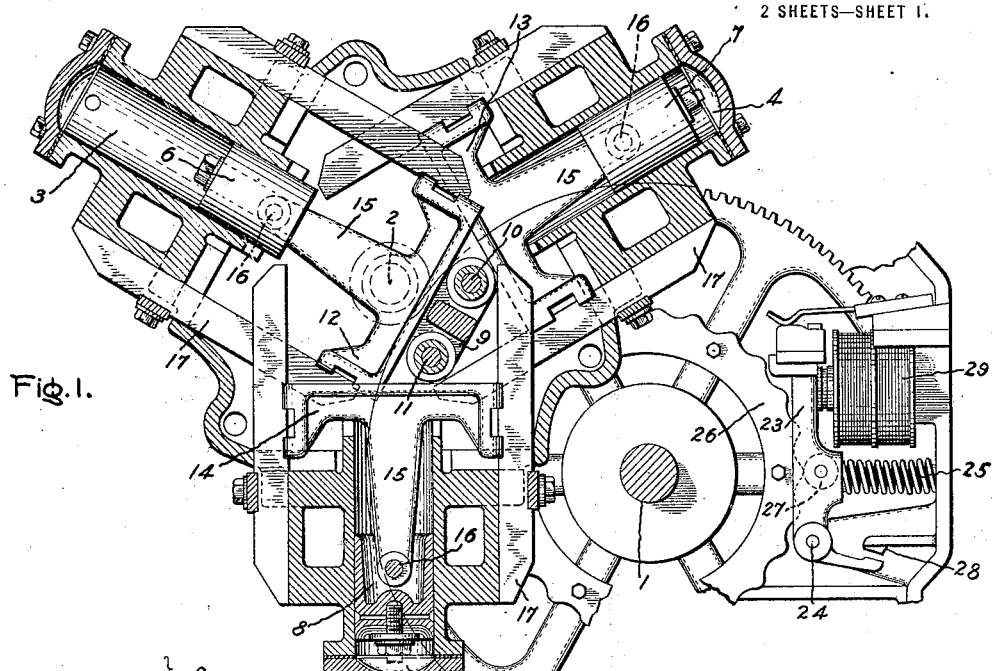

C. T. CROCKER.
CONTROLLER FOR ELECTRIC MOTORS.
APPLICATION FILED NOV. 6, 1918.

1,352,250.

Patented Sept. 7, 1920.
2 SHEETS—SHEET 1.

Inventor:
Clarence T. Crocker,
by Albert G. Davis
His Attorney

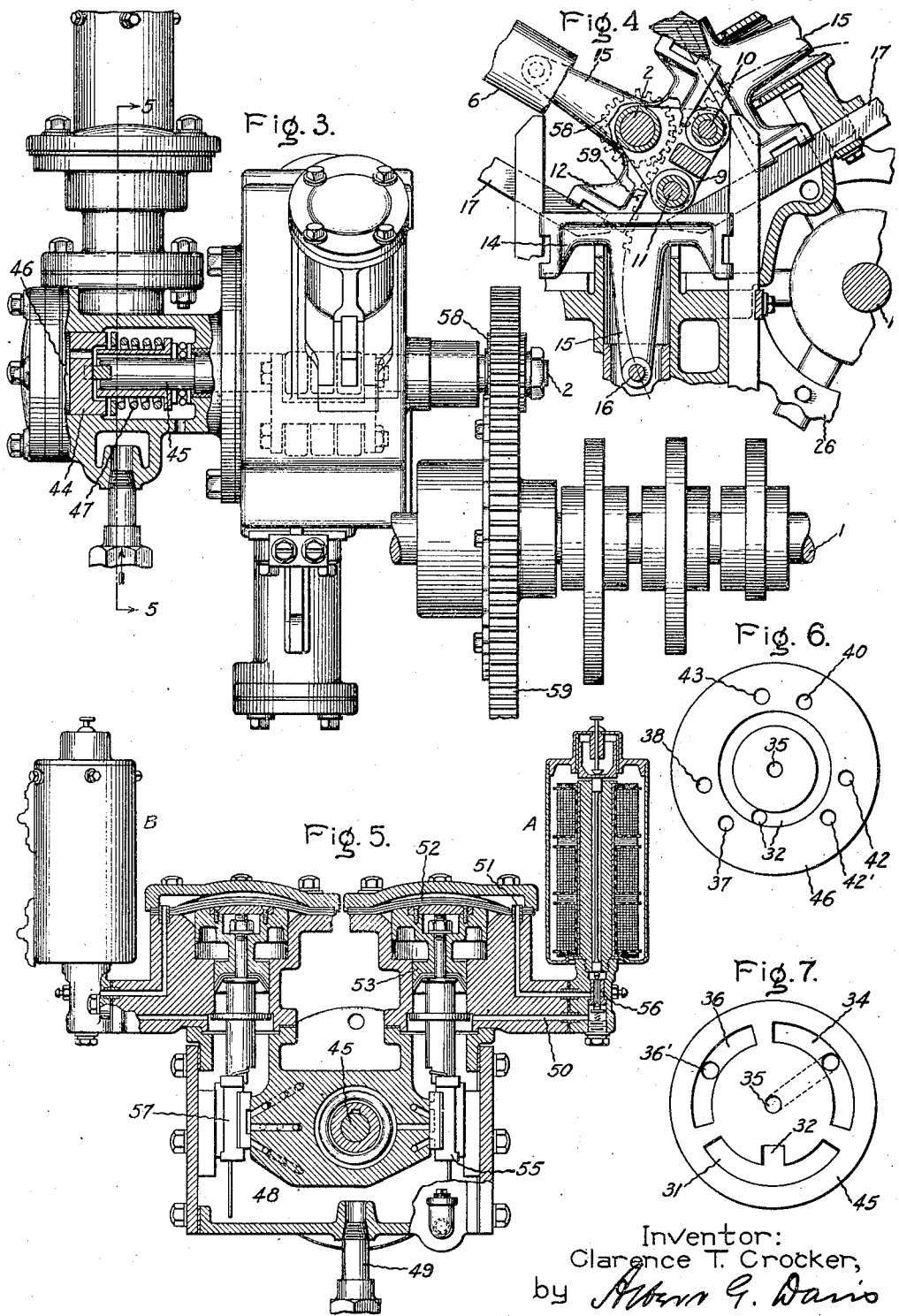

UNITED STATES PATENT OFFICE.

CLARENCE T. CROCKER, OF SCHENECTADY, NEW YORK, ASSIGNOR TO GENERAL ELECTRIC COMPANY, A CORPORATION OF NEW YORK.

CONTROLLER FOR ELECTRIC MOTORS.

1,352,250.  Specification of Letters Patent.  Patented Sept. 7, 1920.

Application filed November 6, 1918. Serial No. 261,332.

*To all whom it may concern:*

Be it known that I, CLARENCE T. CROCKER, a citizen of the United States, residing at Schenectady, in the county of Schenectady, State of New York, have invented certain new and useful Improvements in Controllers for Electric Motors, of which the following is a specification.

My invention relates to the control of electric motors and has for its object the provision of improved means whereby a motor or motors may be started, stopped and generally controlled in a simple, reliable and efficient manner.

More specifically my invention relates to pneumatically operated controllers of the type in which a step-by-step movement is desired. The operation of pneumatically operated controllers such as are commonly employed is rather difficult to control accurately and simply, and one of the objects of my invention is to provide means whereby such operation may be effected in a simple and reliable manner. It has been found that a multiple cylinder arrangement, preferably having three cylinders 120 degrees apart, possesses certain advantages in bringing about positive step-by-step control. The arrangement of the engine is such that a complete stroke of each piston in its cylinder turns a shaft 120 degrees which is equivalent to one step of the controller. In the control which I provide the air is left on each piston when its stroke is completed, thereby facilitating the accurate stopping of the engine. This result, combined with the admission of air under pressure to the successive pistons and the exhausting of the others, I am able to accomplish with a very simple arrangement involving two electromagnetically operated valves. In one form of my invention these valves operate in conjunction with a distributing valve which I have herein disclosed as of the rotary type driven by the pistons. The arrangement is such that when both electromagnetically operated valves are energized the engine will be driven in one direction and when both are deënergized it will be driven in the reverse direction, but when one is energized and the other deënergized the engine will be positively stopped. The direction of operation of the engine is controlled by one of said valves by admitting air under pressure through the distributing valve at the end of a stroke to either the piston following or the piston preceding the one just operated. I also provide novel means for controlling the electromagnetically operated valves through a master switch, the arrangement being such that the movement of the master switch corresponds definitely to a piston stroke, and hence with a step on the controller. In one form of my invention the master switch is moved back and forth between two positions to effect the successive piston strokes, and by moving the master switch to a third or "off" position the air will be admitted to the pistons in such a way as to cause a reverse direction of movement of the controller.

Other objects of my invention and features of novelty, such as the construction and arrangement of the rotary valve and the particular arrangement of the step-by-step device on the controller, will appear in the course of the following specification in which I have embodied my invention in concrete form for purposes of illustration.

Figure 2:
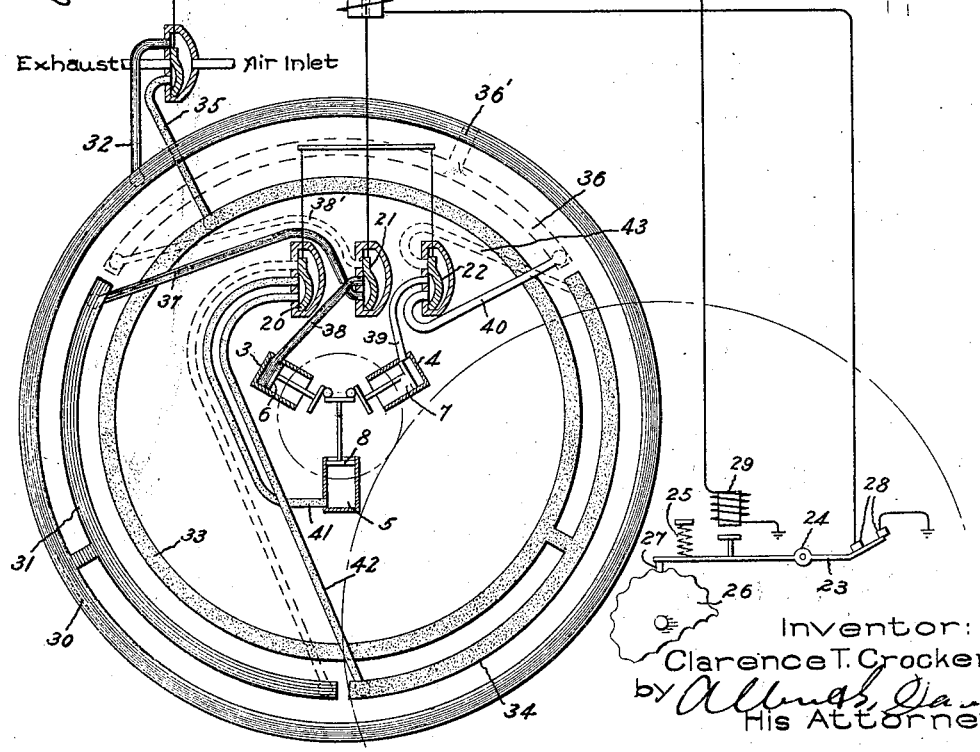

In the accompanying drawing Figure 1 is a sectional view through the cylinders of my automatic engine. Fig. 2 is a diagrammatic view illustrating the operation of the engine and controller; Fig. 3 is an elevation of a pneumatic engine and controller shaft partly in section; Fig. 4 is a detail of Fig. 1 showing the connection between the controller and the triangular shaped member operated by the pistons of the pneumatic engine; Fig. 5 is a section on the line 5—5 of Fig. 3; and Figs. 6 and 7 are views of the valve passages.

Referring to the drawings, 1 is a controller shaft driven by my pneumatic engine through crank shaft 2 and gearing. This pneumatic engine comprises three cylinders 3, 4 and 5, mounted around the crank shaft, the center line of the cylinders being radial to the center line of the shaft, at equal distance from each other, that is, 120 degrees apart. Pistons 6, 7 and 8 fit into the cylinders 3, 4 and 5 respectively, and are arranged to drive the crank shaft with a step by step movement, a complete stroke of each piston corresponding to an angular movement of 120 degrees of the crank shaft. Each piston is single acting, that is, it drives in one direction only and is returned freely by the operation of the succeeding piston. Instead of connecting the crank shaft with the pistons in the usual manner by a connecting rod journaled on the crank shaft, the crank is free with respect to the connecting rod, that is, the connecting rod pushes the crank shaft forward but is not attached to it. The arrangement is such that when the piston makes its complete stroke there is no possibility of its going any farther, as it is mechanically and positively stopped. In this position the movement of one of the other pistons would turn the crank shaft in one direction, while the movement of the other piston would turn the crank shaft in the other direction. The particular connection between the pistons and the crank shaft which I have illustrated comprises a triangular shaped member 9 provided with rollers 10 and 11 at two of the corners, while the third corner is secured to the crank shaft 2. The pistons are provided with driving heads 12, 13 and 14, each having an elongated shank 15 pivoted to its piston at 16. These driving heads slide in guides 17 and have flat driving surfaces which engage the rollers 10 and 11.

The operation of my improved positive stop arrangement will be clearly understood from a consideration of Fig. 1. In this figure, piston 6 has completed a stroke and the two rollers 10 and 11 both engage the flat surface of the driving head 12 at equal distances on opposite sides of the center line of the piston. The piston, therefore, has no turning movement whatever upon the crank shaft. Furthermore, any tendency of the driving head to return will not be transmitted to the crank shaft since the driving head is free of the crank member. As hereinafter pointed out, there is no tendency of the driving head to return since, at the end of a stroke, pressure is left on the piston until the pressure is applied to the succeeding piston. It will be further noted from Fig. 1 that while the crank shaft member 9 is in a position of equilibrium with reference to the driving head 12, this is not true with reference to the driving heads 13 and 14. The roller 10 on the crank member engages the driving head 13 to the left of the center line of thrust, so that any forward movement of this head will drive the crank member, and hence the crank shaft, in a clockwise direction, whereas the roller 11 occupies an opposite position with reference to driving head 14, and hence a forward movement will drive the crank member in the opposite direction. This same relative position of the parts is assumed at the end of each stroke, so that by supplying pressure to one of the two pistons which are in retracted or operative position, the crank will be turned in one direction, while by supplying pressure to the other it will be turned in the opposite direction.

In Fig. 2 I have illustrated diagrammatically the valve arrangement whereby the admission and exhaust of the air to the cylinders is controlled. Referring to this drawing it will be seen that I have provided two electromagnetic valves, which I shall designate as a whole as A and B respectively. These valves are normally held in an open position by springs $a$ and $b$ respectively. I have shown these valves only diagrammatically in order to illustrate their function and have not attempted to show their structural arrangement. Each of these valves has two positions, one of which it assumes when its winding is energized and the other when it is deënergized. Valve B is shown for purposes of illustration and to facilitate an understanding of the arrangement as a triple valve, that is, there are three movable members 20, 21 and 22, one for each cylinder, whereas the valve A is shown as having only a single valve member. If the two valves A and B are both in the same position, air is admitted to a cylinder and the crank shaft will be rotated, the direction depending upon the position of the valves. If they are both in the energized position, the movement will be forward, whereas if they are both in deënergized position the movement will be reversed. As shown in Fig. 2, for instance, the valves are both in energized position and air is admitted to cylinder 3 so as to give a forward or clockwise rotation, but if the valves were both in deënergized position, the cylinder 4 would receive air and the direction of rotation would be reversed. If, therefore, the two valves were left in either the energized or deënergized position, the shaft would continue to rotate in either a forward or reverse direction until it reached a positive stop, whereas if the valve B alone be moved to the opposite position without changing valve A, or if the two valves occupy opposite positions, the operation of the engine will be stopped. The arrangement which I employ, however, is such that while valve A is left in one position, when a movement of the controller through more than one step is desired, the valve B is moved to deënergized position automatically at each step and is restored by the operator, thereby giving a step by step movement to the crank shaft under the control of the operator.

The arrangement whereby the magnet winding of valve B is controlled at each step is illustrated in Fig. 2, from which it will be seen that the circuit of the winding is controlled by switch arm 23, pivoted at 24. The switch arm is normally held in closed position by spring 25, and is opened by the rotation of a star wheel 26, having teeth corresponding with the steps of the controller and rotating therewith. As shown, a projection 27 (a roller in Fig. 1) engages the teeth of the star wheel and lifts the switch arm to open the circuit of the magnet B at contacts 28. When it is lifted, however, it is held in raised position by a magnet 29 which is energized by the master controller C direct to ground. In order to take another step, therefore, the magnet 29 must be deënergized by the operator so as to permit the spring 25 to force the switch member to closed position. As each step is made, therefore, the master controller being in position 2, the circuit of the winding of valve B is automatically opened by the star wheel and is closed by the operator moving the master controller back to position 1, thereby deënergizing magnet 29, and then back to position 2 which reënergized winding B. The result is that the controller takes a step at a time in accordance with the movement of the master controller by the operator from position 2 to position 1 and back.

I shall now describe in detail the arrangement of the valves and air passages whereby the result above described is accomplished. For purposes of illustration I have shown the rotating valve as being composed of an outer ring or passage 30 connected with a segmental passage 31. These two passages are shown shaded and receive air from the reservoir, through valve A and conduit 32. There is also an inner ring 33 and an outer segmental ring 34 connected to it, which I have shown stippled, this being connected with the valve A by conduit 35. Valve A being in its energized position, therefore, as shown in the drawing, the shaded passages will receive air under pressure from the reservoir, whereas if the valve A is in its upper or deënergized position, the stippled passages will receive air under pressure from the reservoir. When one passage is connected with the reservoir the other is connected with the exhaust. There is also a segmental passage 36 which I have shown dotted, and which is connected to the atmosphere, for purposes which will hereinafter appear. It will be understood, of course, that these circular passages form part of a rotating valve which revolves 120 degrees at a step, that is, 120 degrees upon each complete stroke of a piston, and that the conduits connected with these passages are stationary.

Assume now the parts in the position shown in the drawing, the winding of the valves A and B being energized, air under pressure will enter the conduit 32 through the valve A, thence through the outer passage 30 to the inner passage 31, conduit 37, to the valve member 21, through the conduit 38 to the cylinder 3. Since both of the other cylinders are now connected to exhaust (cylinder 4 through conduit 39, valve member 22, conduit 40, through the passage 36 to exhaust 36', and cylinder 5 through conduit 41, valve member 20, conduit 42, passages 34 and 33 and conduit 35), the piston 6 will be forced forward rotating the crank shaft in a clockwise direction as shown in Fig. 2. The piston 8 of the cylinder 5 which has just made a stroke is at the limit of its movement and is, therefore, forced backward and the piston 7 of cylinder 4 is near its inward limit and is forced back slightly. As the piston 6 moves forward its full stroke, the shaft will be rotated in a manner heretofore described. As the shaft moves forward, the magnet winding B is deënergized at the contacts 28 and the valve B moves to its opposite position, the result of which is to interrupt the passage from the conduit 37 to conduit 38, and open conduit 38', which is now in engagement with passage 31 to conduit 38, thus maintaining air pressure in cylinder 3. The cylinder is not, however, exhausted, as air pressure remains in the cylinder. It will be understood, of course, that during this step the rotating valve will revolve 120 degrees so that the end of the passage 31 passes into coöperating engagement with the conduit 40 which, however, is now cut off from cylinder 4 by the valve member 22. If the operator desires to move another step, he moves the master controller back to position 1 to deënergize the winding 29, and then back to position 2, so that the circuit of the winding of valve B will be again completed, thereby leaving the valves A and B once more in energized position. The passage is now open from conduit 40 to cylinder 4 so that the piston 7 moves forward and at the same time cylinder 3 is exhausted through the conduit 37 which is now in engagement with passage 34 so that the exhaust takes place through conduit 35. The result is that the controller moves forward another step. In the same way by moving the master controller to position 1 and back to position 2, the air pressure will be admitted to cylinder 5 through conduit 42, which upon the second step will be in engagement with passage 31.

Suppose now that instead of going continuously forward the operator wishes to reverse. Assume that the parts are in position shown in Fig. 2, that is, a stroke has just been completed by the piston 8, but the winding of the valve B has not yet been energized by moving the master controller from position 1 to position 2, and hence the valve is in the upper position. In other words, the operator has not yet moved the master controller to energize the valve B to move forward, but instead deënergizes the winding of valve A by moving the master controller to off position to go backward. The valves A and B will now both be in the deënergized position which is the opposite to that shown in the drawing, so that the air pressure instead of being admitted to cylinder 3 will be admitted to cylinder 4 through conduit 35, passage 33, passage 34, conduit 43, valve member 22 and conduit 39. This will drive the shaft in a counter clockwise direction step by step, and will continue to operate automatically in that way if the operator keeps the master controller in the off position. To stop, the master controller is moved to position 1, and to restore the forward movement the master controller is moved to position 2. In this way the controller will be moved forward one step at a time in either direction at the will of the operator.

As above pointed out, the rotation of the circular passages in Fig. 2 is purely diagrammatic and illustrative, since it does not represent the actual construction of the sliding valve. The mechanical construction of this valve arrangement is indicated in Figs. 3, 5, 6 and 7 from which it will be seen that the member 44 which corresponds with the moving member in Fig. 2 is driven by a shaft 45 which is an extension of the crank shaft and forced toward its coöperating valve member 46 by a spring 47. These two parts of the valve, the stationary part and the moving part, having their ports and passages as indicated in Figs. 6 and 7 constitute the sliding valve arrangement shown diagrammatically in Fig. 2. I have indicated as far as possible the ports and passages in Figs. 6 and 7 with the same numerals as are used in Fig. 2. It is, therefore, unnecessary to go into further detail regarding the valve arrangement.

In Fig. 5 I have shown some of the details of the valves. Air is admitted to the air chest 48 through the pipe 49, from which it is distributed by valves A and B. When the windings of the valve A are energized, air passes through the passage 50 into passage 51 and thence to the diaphragm 52 forming part of the plunger 53. Secured to this plunger is a valve member 55 which corresponds with the sliding member of valve A, Fig. 2. When the windings are deenergized exhaust takes place through the exhaust passage 56. In like manner the energization of the winding of valve B moves the valve member 57 which corresponds with the three moving members 20, 21 and 22 in Fig. 2.

It will be seen that I have provided a pneumatically operated controller in which a positive step by step movement is brought about under the control of the operator, the arrangement being such that there is no possibility of over travel, while at the same time being very effective and simple.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. A circuit controller comprising a controlling member, three fluid actuated reciprocating pistons disposed at angles of 120 degrees from each other for operating the same and two electromagnetically operated valves controlling the admission of fluid under pressure to said pistons to control the direction of rotation of said member and positively stop the same.

2. A circuit controller comprising a controlling member, a plurality of fluid actuated reciprocating pistons for operating the same, and two electromagnetically operated valves for admitting fluid under pressure to said pistons to rotate the member in either direction and positively stop the same by leaving the pressure on the last piston to operate.

3. A circuit controller comprising a controlling member, a plurality of fluid actuated reciprocating pistons for operating the same, two electromagnetically operated valves for admitting fluid under pressure to said pistons and means whereby when both of said electromagnets are energized the controlling member will be moved in one direction by said pistons, when both are deenergized it will move in the reverse direction and when one is energized and the other deënergized the member will be positively stopped.

4. In a circuit controller, a controlling member and means for operating the same step by step, comprising three fluid actuated reciprocating pistons disposed at angles of 120 degrees from each other, a rotary valve operated by said pistons for admitting fluid under pressure to said pistons, two electromagnetically operated valves for controlling the flow of fluid to said valve and a master switch for controlling the operation of said electromagnetic valves.

5. A circuit controller comprising a controlling member, a plurality of fluid actuated reciprocating pistons for operating the same, two electromagnetically operated valves controlling the admission of fluid under pressure to said pistons, a master switch for controlling said valves and means whereby fluid pressure is maintained on each piston at the end of its stroke until one of said electromagnetic valves is operated by a movement of the master switch.

6. A circuit controller comprising a controlling member, a plurality of fluid actuated, successively operating pistons for operating the same step by step, an electromagnetically operated valve controlling the admission of fluid under pressure to said piston, a master switch for controlling said valve and connections whereby at each step the valve is automatically actuated independently of the master switch to cut off fluid pressure from the pistons until the valve is operated by the master switch to restore the fluid pressure to the pistons and means for independently applying fluid pressure to each piston during its stroke.

7. A circuit controller comprising a controlling member, three fluid actuated reciprocating pistons disposed at angles of 120 degrees from each other for operating the same step by step, two electromagnetically operated valves for controlling the admission of fluid under pressure to said pistons and the direction of rotation of said member, a master switch and connections whereby a backward and forward movement thereof causes one of said electromagnets to be operated to effect the successive operation of the pistons and a step by step movement of the controlling member.

8. A circuit controller comprising a controlling member, three fluid actuated reciprocating pistons disposed at angles of 120 degrees from each other for operating the same step by step, two electromagnetically operated valves for controlling the admission of fluid under pressure to said pistons and the direction of rotation of said member, a master switch for controlling said valves and connections whereby a backward and forward movement thereof causes the successive operation of the pistons and a step by step movement of the controlling member.

9. A circuit controller comprising a controlling member, a plurality of fluid actuated successively operating pistons for operating the same step by step, a master switch and connections whereby at each step the fluid is cut off from all pistons excepting the one causing the step and is restored by the operation of the master switch.

10. A circuit controller comprising a controlling member, three fluid actuated successively operating pistons disposed at angles of 120 degrees from each other for operating the same step by step, an electromagnetically operated valve controlling the admission of fluid under pressure to said pistons, a master switch for controlling said valve and connections whereby at each step the valve is operated to cut off the fluid from the pistons and is restored by the operation of the master switch.

11. A circuit controller comprising a controlling member, a plurality of fluid actuated successively operating pistons for operating the same step by step, a master switch, connections whereby at each step the fluid is cut off from all pistons excepting the one causing the step and is restored by the operation of the master switch and means whereby pressure is left on said latter pistons until the master switch is operated.

12. A circuit controller comprising a controlling member, a plurality of fluid actuated pistons for operating the same, a valve driven thereby for admitting fluid to said pistons successively, an electromagnetically operated valve controlling the passage of fluid to said driven valve, an electromagnetically operated valve controlling the passage of fluid from the driven valve to the pistons and a master switch for controlling said electromagnetic valves.

13. A circuit controller comprising a controlling member, a plurality of fluid actuated pistons for operating the same, a valve driven thereby for admitting fluid under pressure to said pistons successively, an electromagnetic valve for connecting the driven valve to either the fluid supply or exhaust, a second electromagnetic valve either connecting the driven valve with the pistons or cutting off the fluid and a master switch for controlling the electromagnetic valves.

14. A circuit controller comprising a controlling member, a plurality of fluid actuated pistons for operating the same, a valve driven thereby for admitting fluid under pressure to said pistons successively, an electromagnetic valve for connecting the driven valve to either the fluid supply or exhaust, a second electromagnetic valve for either connecting the driven valve with the pistons or cutting off the fluid supply thereto said driven valve in its movement connecting each piston during its stroke with the fluid supply after the other pistons are cut off and a master switch for controlling said electromagnetic valves.

15. A circuit controller comprising a controlling member, electromagnetically controlled means for operating the same step by step, a switch automatically operated at each step to affect the electromagnetic means and stop the movement when a step is completed and a master switch for controlling the electromagnetic means and arranged to restore the said switch to cause another step to be taken.

16. A circuit controller comprising a controlling member, electromagnetically controlled means for operating the same step by step, a switch automatically operated at each step to affect the electromagnetic means and stop the movement when the step is completed, an electromagnet for holding the switch in operated position and a master switch controlling the electromagnetic means and the electromagnet.

17. A circuit controller comprising a controlling member, fluid actuated electromagnetically controlled means for operating the same step by step, a switch automatically operated at each step to affect the controlling member and stop the movement when a step is completed and a master switch for controlling the electromagnetic means and arranged to restore the said switch to cause another step to be taken.

18. A circuit controller comprising a controlling member, electromagnetically controlled means for operating the same step by step, a switch mechanically operated at each step to affect the electromagnetic means and stop the movement when a step is completed, an electromagnet for holding the switch in operated position and a master switch for deënergizing the electromagnet to permit another step to be taken.

19. A circuit controller comprising a controlling member, a plurality of fluid actuated pistons for operating the same, a valve driven thereby for admitting fluid to said pistons successively, an electromagnetic valve for connecting the driven valve to either the fluid supply or exhaust, a second electromagnetic valve for either connecting the driven valve with the pistons or cutting off the fluid supply, said driven valve in its movement connecting each piston during its stroke with the fluid supply after the other pistons are cut off, a master switch and means whereby at each step the second electromagnetic valve is operated independently of the master switch to its cutting off position.

20. A circuit controller comprising a controlling member, a plurality of fluid actuated pistons for operating the same, a rotary valve driven thereby having two parts, one of which is connected with the fluid supply and admits fluids to the pistons successively while the other is connected with the exhaust and connects successively with other pistons so that while one piston is connected with the supply another is connected with the exhaust and a valve for reversing the connections to said valve parts.

21. A circuit controller comprising a controlling member a plurality of fluid actuated pistons for operating the same step by step, a rotary valve driven thereby having two parts, one of which is connected with the fluid supply and admits fluid to the pistons successively while the other is connected with the exhaust and connects successively with other pistons so that while one piston is connected with the supply another is connected with the exhaust, an electromagnetically controlled valve for reversing the connections to said valve parts and an electromagnetically controlled valve controlling the connection between the valve parts and the pistons.

22. A circuit controller comprising a controlling member, a plurality of fluid actuated pistons for operating the same step by step, a rotary valve driven thereby having two parts, one of which is connected with the fluid supply and admits fluid to the pistons successively while the other is connected with the exhaust and connects successively with other pistons so that while one piston is connected with the supply another is connected with the exhaust, an electromagnetically controlled valve for reversing the connections to said valve parts, an electromagnetically controlled valve controlling the connection between the valve parts and the pistons, a master switch for controlling said valves and means whereby said latter valve is operated independently of the master switch at each step.

In witness whereof, I have hereunto set my hand this 4th day of November, 1918.

CLARENCE T. CROCKER.